United States Patent [19]

Bergman

[11] 4,179,106
[45] Dec. 18, 1979

[54] APPARATUS FOR LOCATING AND CLAMPING A WORK MEMBER SUPPORTING FIXTURE

[76] Inventor: Raymond A. Bergman, 107 E. Second St., Minster, Ohio 45865

[21] Appl. No.: 924,958

[22] Filed: Jul. 17, 1978

Related U.S. Application Data

[60] Continuation of Ser. No. 815,676, Jul. 14, 1977, abandoned, which is a division of Ser. No. 684,725, May 10, 1976, Pat. No. 4,058,885.

[51] Int. Cl.² ............................................. B23Q 7/00
[52] U.S. Cl. .................................... 269/20; 414/676
[58] Field of Search ..................... 29/559, 563, 33 P; 408/56, 67, 69, 71, 76; 269/20, 67; 51/235; 302/31, 29, 17

[56] References Cited

U.S. PATENT DOCUMENTS

| | | | |
|---|---|---|---|
| 2,785,928 | 3/1957 | Hanson | 302/29 |
| 2,885,415 | 5/1959 | Schurger | 269/20 X |
| 3,208,270 | 9/1965 | Hill | 408/76 X |
| 3,209,623 | 10/1965 | Schardt | 269/20 X |
| 3,253,665 | 5/1966 | Schienle | 408/76 X |
| 3,376,764 | 4/1968 | Schardt | 51/235 |
| 3,651,956 | 3/1972 | Kornylak | 302/29 |
| 3,693,965 | 9/1972 | Mitsengendler | 269/20 |
| 3,807,035 | 4/1974 | Moorman et al. | 408/76 X |

Primary Examiner—Robert C. Watson
Attorney, Agent, or Firm—Albert L. Jeffers; John F. Hoffman

[57] ABSTRACT

Apparatus for locating a work member supporting fixture on a table and for clamping the fixture in located position on the table, especially to locate and clamp the work member during machining; in which the table is fixedly mounted in place, for example, in a machine tool with an upwardly facing horizontal surface exposed. The work member fixture has a downwardly facing surface receivable on the upper surface of the table and is adapted for fixedly supporting a work member therein. The table has passages therein under fluid pressure and a plurality of outlets lead from the passages through the upper surface of the table and are preferably provided with normally closed valves adapted to be actuated into open position by movement of a fixture thereover. The passages and outlets provide means for establishing a fluid film under pressure between the downwardly facing surface of the fixture and the upwardly facing surface of the table so that the fixture floats on the film and can be moved about easily on the table. Cooperating elements of pin and socket locating devices on the fixture and table provide for the location of the fixture in predetermined positions on the table and clamps are provided to clamp the fixture in located positions on the table. The locating devices on the table bear a predetermined relation to the work axis of the machine tool, a spindle axis, for example, and can, therefore, be depended on to locate the fixture in predetermined accurate positions for machining. A work member located in the fixture can, thus, be positioned rapidly for the machining of various regions thereof.

26 Claims, 18 Drawing Figures

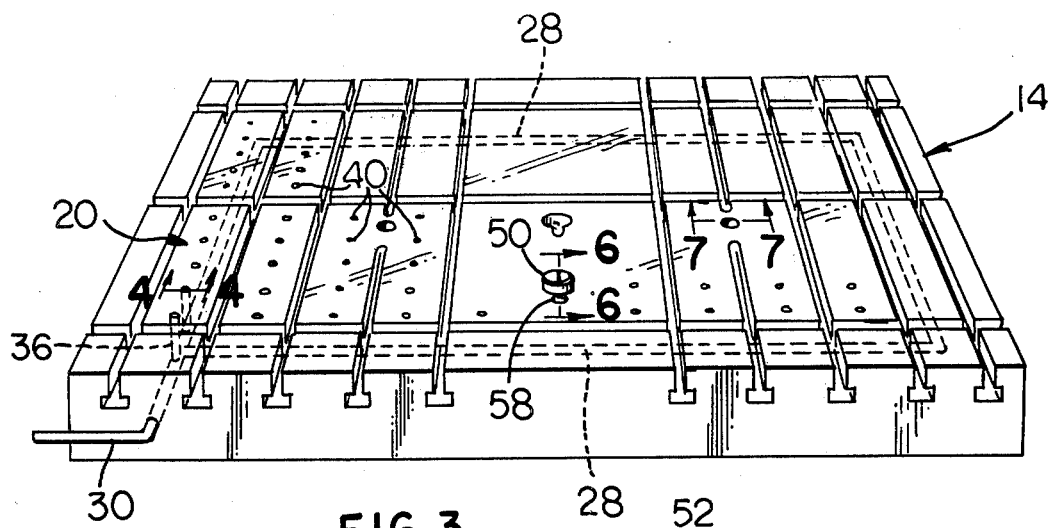
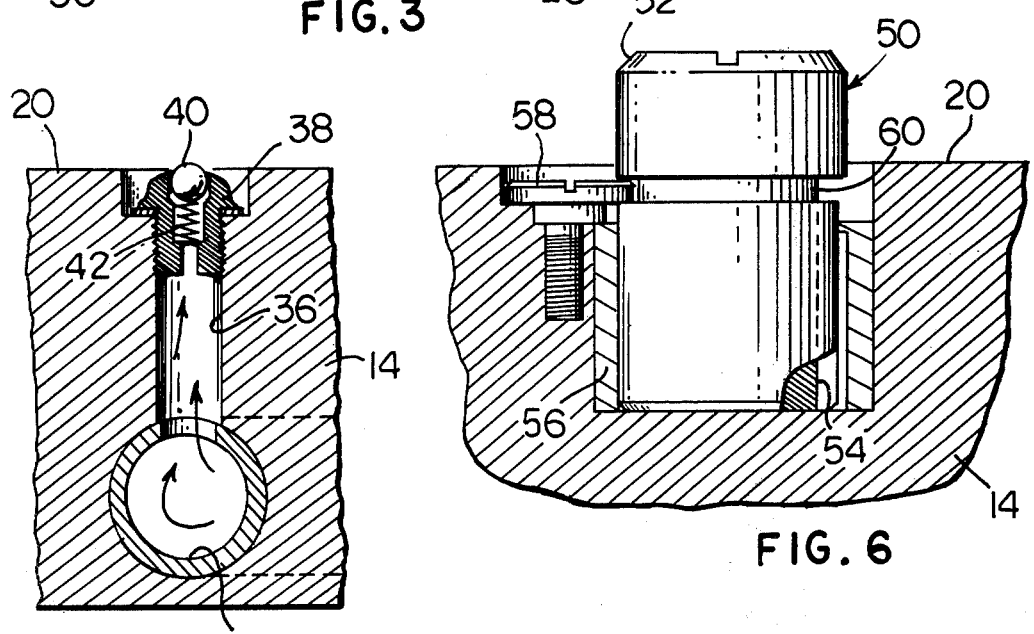
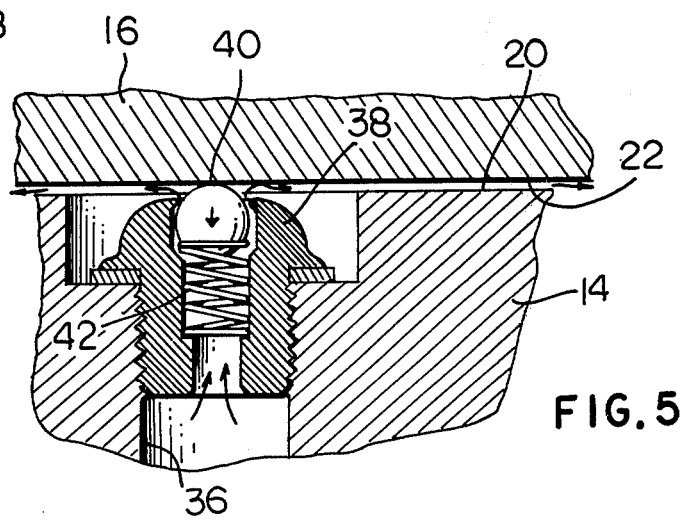

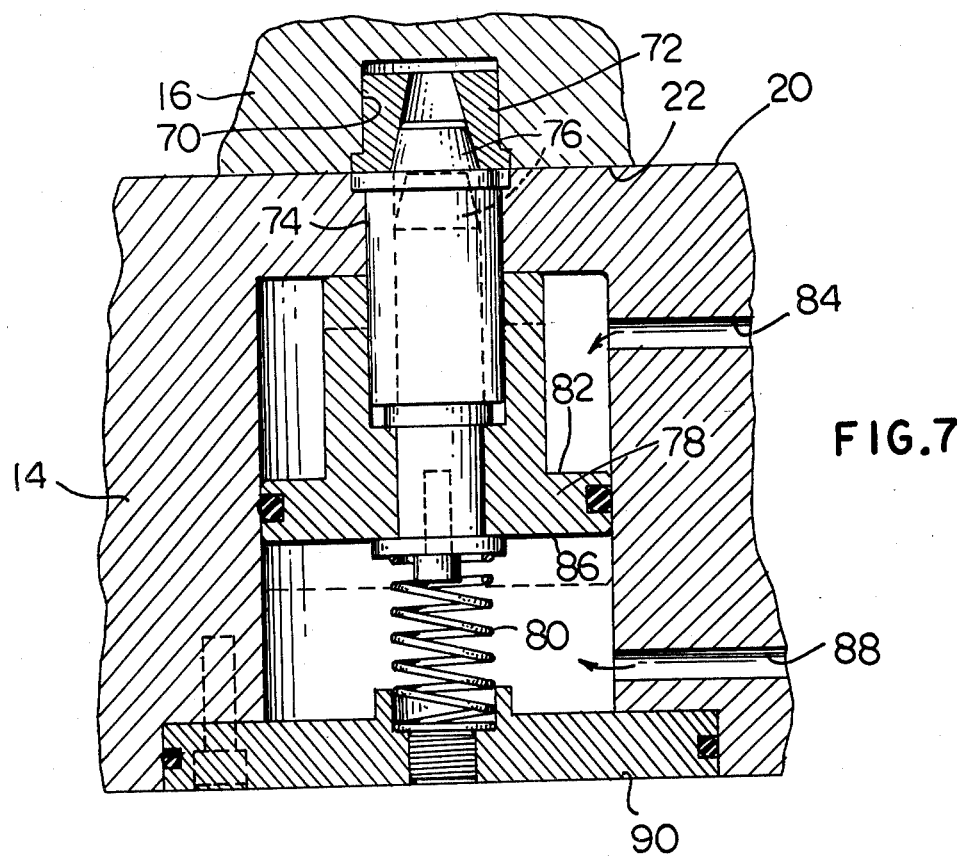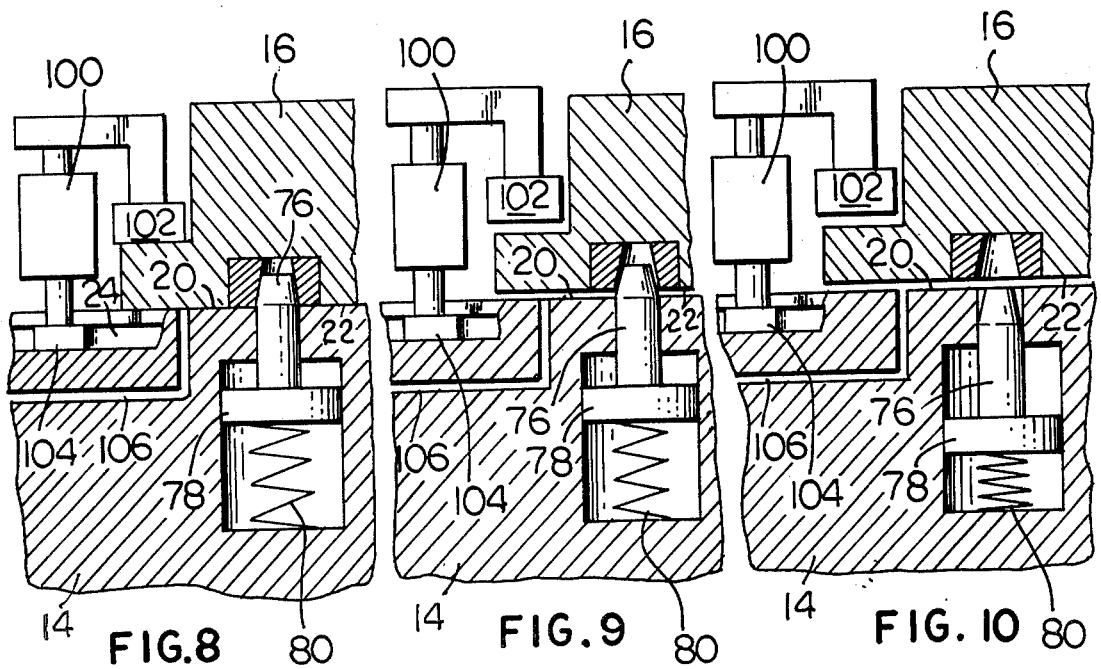

APPARATUS FOR LOCATING AND CLAMPING A WORK MEMBER SUPPORTING FIXTURE

CROSS REFERENCE TO RELATED APPLICATIONS

This is a continuation of application Ser. No. 815,676 filed July 14, 1977, now abandoned which is a division of application Ser. No. 684,725 filed May 10, 1976 now U.S. Pat. No. 4,058,885.

BACKGROUND OF THE INVENTION

The present invention relates to an apparatus for the locating of a work member supporting fixture on a support table for the clamping of the fixture in located position on the table, especially for the machining of various regions of the work member and most especially in such a manner that even heavy work members and fixtures can readily be moved about in a machine tool into various machining positions.

The machining of work members of any substantial size in most machine tools involves time consuming, laborious repositioning of the work member in the machine tool as various regions of the work member, other than, for example, concentric portions thereof, are to be machined. When the work members being machined reach substantial size, it becomes necessary to use hoists and other power devices for elevating and moving the work members about and for lowering the work members into the proper positions for the machining of respective regions of the work member.

Such moving about of work members is, as mentioned, time consuming and laborious and can be attended with some danger. Further, the precise positioning of the work member in a selected position under such conditions is difficult and cannot always be achieved with the desired accuracy.

The present invention has as a primary objective the provision of an apparatus for use in respect of the moving and locating of work members, particularly heavy work members, and especially in machine tools, in which the moving about of the work member can be accomplished relatively easily without the use of power equipment and whereby the work member can be accurately located in respective machining positions and all being accomplished in a minimum amount of time.

BRIEF SUMMARY OF THE INVENTION

According to the present invention, a table is provided in a machine tool which may be a table member resting on a machine tool bed or which may be a table member incorporated in the machine tool construction. In any case, the table has a substantially horizontal upwardly facing surface for supporting work members to be machined.

According to the present invention, work members to be machined are mounted in fixtures provided with suitable means for securing work members in place therein with each fixture having a downwardly facing horizontal bottom surface adapted to rest on the upper surface of the table.

The table according to the present invention is provided with fluid pressure passages therein and a plurality of outlet connections in distributed relation in respect of the upper surface of the table extend from the fluid pressure passages upwardly through the top surface of the table. Advantageously, each connection has a normally closed valve at the upper end, each of which has an actuating portion protruding upwardly to above the level of the table so that, when a fixture is set on the table, the valves therebeneath will be opened and a fluid pressure film will be established between the fixture and the table which will provide for substantially friction free movement of the fixture on the table. Advantageously, the fluid under pressure is air which is readily available in most locations where machine tools are employed.

The table may be formed with T slots therein similar to what is provided in a great many machine tool beds and clamp members slidable in the slots are provided which are engageable with the fixture in adjusted positions thereof for clamping the fixture fixedly to the table.

It is advantageous for the table to have a main pivot element, such as a pin projecting upwardly therefrom, which may be in the region of about the middle of the table, and which is receivable in a socket in the bottom of the fixture resting on the table.

The fixture, in this case, is constrained to move circularly on the bed. In one modification, the socket in the fixture is replaced by a slot, and in this case, the fixture is not only rotatable on the bed but is translatable thereon in desired directions.

Each fixture, furthermore, comprises one or more downwardly opening sockets in the bottom wall, and the table is provided with vertically reciprocable locating pin elements engageable with the sockets. The locating sockets and locating pins are preferably tapered and are precisely located on the fixture and on the table so that, when a locating pin is engaged in a locating socket, the fixture becomes precisely located on the table, especially with reference to the axis of the tool, or tools, driven by the machine tool.

The locating pins referred to are preferably spring biased in the upward direction to slidably engage the bottom of the fixture so that the pins will enter the respective sockets as the fixture approaches the respective position. Fluid operable actuating means are provided for retracting each locating pin downwardly into the table to free the fixture for movement on the table while other fluid operable actuating means are provided for driving the locating pins upwardly to cause the locating pins firmly to engage the respective sockets and effect precise location of the fixture on the table.

BRIEF DESCRIPTION OF THE DRAWINGS

The exact nature of the present invention will become more clearly apparent upon reference to the following detailed specification taken in connection with the accompanying drawings in which:

FIG. 3 is a perspective view showing the upper surface of the table.

FIG. 4 is a section indicated by line IV—IV on FIG. 3 showing a valved connection leading from a passage in the table to the surface on which the work member supporting fixture is supported.

FIG. 5 is a view like FIG. 4 but drawn at enlarged scale showing the valve held open by the fixture so that pressure fluid can flow upwardly through the valve and establish a support film between the fixture and the table.

FIG. 6 is a sectional view indicated by line VI—VI on FIG. 3, showing details in respect of a pivot pin mounted on the table.

FIG. 7 is a sectional view drawn at enlarged scale and indicated by line VII—VII on FIG. 3 and illustrating a lock pin reciprocably mounted in the table.

FIG. 8 is a fragmentary view showing a work member supporting fixture in located position on the table and clamped in place thereon.

FIG. 9 is a view like FIG. 8 but shows the clamp released and the work member fixture elevated from the table by a fluid film therebetween.

FIG. 10 is a view like FIG. 9 which shows the lock pin retracted into the table so that the work member supporting fixture is now released and is free to move on the table.

DETAILED DESCRIPTION OF THE INVENTION

Figure 1:
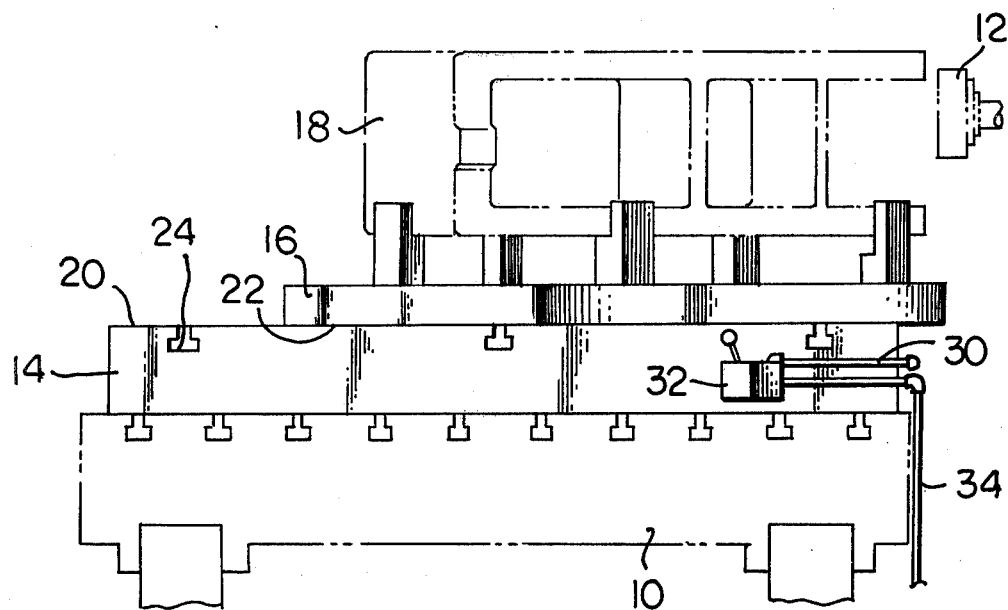
FIG. 1 is a view showing a portion of a machine tool having a table and work member according to the present invention mounted thereon showing a work member in the process of being machined.

Referring to the drawings somewhat more in detail, FIG. 1 is a relatively schematic view of a machine tool having a bed 10 and a working tool 12 which may be rotatable or reciprocable according to well known practices in the machine tool art.

According to the present invention, there is a table or plate 14 mounted on bed 10 in a predetermined position thereon. Table or plate 14 is fixedly connected to bed 10 and may comprise the bed itself, on occasion.

Resting on table 14 is a work member supporting fixture 16 in which a work member 18 is mounted for being machined by tool 12. The table 14 has an upwardly facing top surface 20 and fixture 16 has a downwardly facing bottom surface 22 resting on surface 20. Table 14 is also provided with T-slots 24 for slidably receiving clamp devices which are operable for clamping fixture 16 fixedly in place on table 14 when the fixture is in a desired position thereon.

Figure 2:
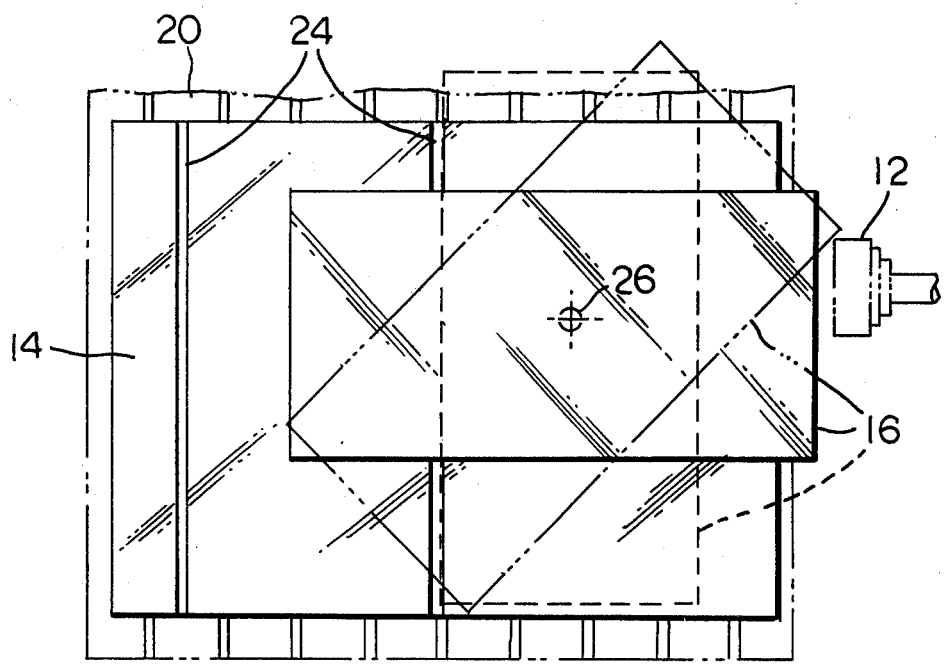
FIG. 2 is a plan view of the FIG. 1 arrangement showing the work member supporting fixture in different positions.

FIG. 2 is a plan view looking down on top of table 14 and fixture 16 and also shown in dotted outline a pivot 26 which may consist of a pin upstanding from table 14 and a socket in the bottom of fixture 16 in which the pin is disposed. The pin permits the fixture to pivot about the axis of the pin to various positions on table 14 for presenting the work member in the fixture in different positions for being machined by tool 12.

FIG. 3 shows more in detail the manner in which table 14 is constructed. Table 14 in FIG. 3 will be seen to comprise a metal block of substantial area and substantial thickness so that it will support heavy work member-fixture combinations without any problems.

The table is provided with air passage means 28 formed therein and communicating with a supply conduit 30 outside table 14 and which is connected via a control valve 32 with the supply of fluid under pressure represented by conduit 34. The fluid under pressure is advantageously air, but could, conceivably, comprise another fluid medium.

Extending vertically upwardly from passage means 28 in block 14 are connection passages or conduits 35 which open through the top surface 20 of table 14. The upper end of each connecting passage is closed by a valve comprising a body so that passages 36, a valve comprising a body 38 which may be threaded into the upper end of the passage and the top of which body is disposed below the level of surface 20 of table 14. The valve body 38 is tubular and captive in the upper end thereof is a valve ball 40 which projects slightly above surface 20 as will be seen in FIG. 4. A spring 42 may be provided which continuously urges valve ball 40 into its upper closed position.

When a fixture 16 is moved on table 14 until the downwardly facing lower surface 22 of the fixture engages ball 40, the ball will be depressed as shown in FIG. 5 and admit fluid under pressure from connection 36 through the bore of valve body 38 and around ball 40 to the space between surfaces 20 and 22. The pressure of the fluid is so selected that a fluid film will be established through the surfaces which will floatingly support fixture 16 and a work member therein so that the fixture-work member combination can easily be moved about on table 14 to a desired position.

As will be seen in FIG. 3, the passage means 28 include sufficient passages to supply a plurality of outlet connections 36 which are distributed substantially uniformly over the entire area of table 14 which is to be employed during the machining of a work member mounted in a fixture resting thereon. As will be seen, the connections 36 terminate at the upper ends in the valves consisting of bodies 38 and 40 with the positions of the valve balls indicated by reference numeral 40 in FIG. 3.

The arrangement described above provides for floatingly supporting the fixture with the work member therein on table 14 so that the fixture can easily be moved about on the table without the use of power operated equipment such as hoists and the like. Rather, the fixture and the work member therein can be moved manually about on table 14 to desired positions thereon.

It is essential, however, that the fixture occupy precisely located positions so the work member in the fixture thereon will be presented properly to the tool or tools which are to perform work thereon. With this in mind, table 14 includes a main pivot pin 50 mounted in a bore provided therefor on table 14 and having an upper end projecting upwardly above surface 20 of table 14 and advantageously bevelled at the upper end as at 52.

The pin 50 is mounted in a bushing 56 and has a groove 54 to provide space for the head of a screw 58 which is threaded into a threaded bore in table 14 and has the periphery of the head engaging an annular groove 60 in pin 50 below the level of table 14. Several locations can be provided in the table 14 for such centering pins. Fixture 16 is provided with an accurate bore for receiving the upper end of pin 50.

When the fixture is introduced into the machine, it is set down on table 14 with the pin received in the bore provided therefor and, when the fluid pressure film is established between the fixture and the table, the fixture can turn relatively freely about the axis of pin 50 as shown in FIG. 2 wherein pivot means 26 corresponds to pivot pin 50 and the corresponding bore provided in the bottom of the fixture.

In addition to the pivot pin 50 which has been described, there are further pins provided in table 14 which serve for locating the fixture in predetermined positions. The locating pins referred to, one of which is shown in section in FIG. 7, are located in precise positions on table 14 with particular reference to the axis of the tools in the machine of which the table forms a part or in which the table is mounted. These pins are engageable with recesses provided in the bottom of the fixture and which are also accurately located in the fixture.

Thus, it comes about that, when one or more pins engage the corresponding recesses in the bottom of the fixture, the fixture will be in an accurately located position on the table. When the pivot pin on the table engages the fixture, only one locating pin is required to determine a fixture location but, as will be seen hereinafter, at least two locating pins could be employed, and the fixture location determined thereby without depending on a pivot pin. To this end, the pivot pin may be retractable into the bed as will also be described hereinafter.

FIG. 7 is a section indicated by line VII—VII on FIG. 3 and shows that the bottom of fixture 16 is provided with bores 70 in which bushings 72 having tapered holes are mounted.

Table 14 is also provided with bores and each bore at the upper end has an elongated bushing 74 in which is slidable a pin 76 having a tapered upper end adapted for seating in the table hole in bushing 72.

At the lower end thereof, pin 76 is connected with a double acting piston 78 spring biased upwardly toward the position illustrated in FIG. 7 by compression spring 80. Each piston 78 has an upwardly facing fluid operable area 82 adapted to receive pressure fluid from a conduit 84 in table 14 to drive the piston and pin 76 downwardly until the upper end of the pin is below the upper surface 20 of table 14.

Alternatively, a supply of pressure fluid to the downwardly facing fluid operable area 86 of the piston from conduit 88 formed in table 14 will drive piston 78 and pin 76 upwardly to effect firm engagement of tapered end 76 with bushing 72.

The lower end of the bore in table 14 in which the piston 78 and pin 76 are mounted is closed by a cover plate 90.

FIGS. 8, 9 and 10 schematically illustrate various steps in connection with the practice of the present invention.

In FIG. 8, a fixture 16 will be seen to be clamped to table 14 by hydraulic clamping device 100 having a vertically movable chute 102 engaging a suitable upwardly facing region of fixture 16 while the hydraulic clamp has a further portion 104 slidable in a respective T-slot 24 of table 14.

In FIG. 8, the hydraulic clamp is engaged and is holding the fixture 16 down on the table while a lock pin 76 may have the respective piston 78 under pressure from below driving the lock pin upwardly into locating position. The air supply to the space beneath the bottom of fixture 16 and the top of table 14 and represented in FIGS. 8, 9 and 10 by conduit 106 is interrupted in FIG. 8.

The releasing of fixture 16 will be seen in FIG. 9 wherein it will be noted that clamp 100 has been actuated to retract chute 102 upwardly while a supply of air under pressure is initiated by a conduit 106 thereby to lift or float fixture 16 upwardly a short distance from the upper surface 20 of table 14.

By supplying air under pressure to the upper side of piston 78, pin 76 will be moved downwardly to the FIG. 10 position thereof. With the parts in the FIG. 10 position, the fixture 16 is movable on the supporting air curtain either in rotation, if a pivot pin is engaged with a hole in the bottom of the fixture, or in translation, if a pivot pin or table 14 is engaging slot means formed in the bottom of fixture 16, or in any direction, if there are no pivot pins on table 14 engaging the fixture.

Figure 11:
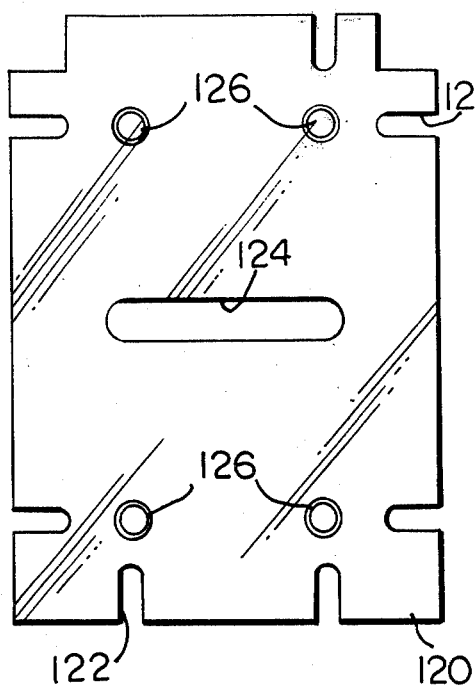
FIG. 11 is a plan view looking up from the underneath side of a typical work member supporting fixture according to the present invention.
Figure 12:
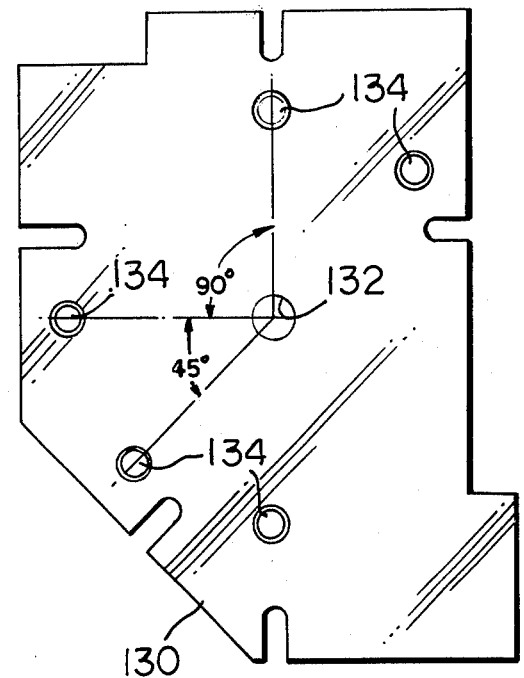
FIG. 12 is a view like FIG. 11 but shows another type of work member supporting fixture from the underneath side.

A pair of typical fixtures are shown in FIGS. 11 and 12 looking up from below. The fixture 120 in FIG. 11 has slots 122 which may be provided for assisting in connecting a work member thereto. The table has a slot 124 formed into the bottom for receiving a pivot pin on the table and which will permit translation and rotation of the fixture on the table.

The fixture is also provided with a plurality of lock pin holes 126 distributed thereover and each adapted for receiving a table lock pin on the table. With the arrangement of FIG. 11, rotation and translation of the fixture 120 can be had to a plurality of different locations in which a work member thereon can be machined.

In FIG. 12, the fixture 130 is a central hole 132 for receiving a pivot pin while circumferentially distributed around the hole and spaced equal radial distances therefrom are lock pin holes 134 for receiving lock pins. With the arrangement of FIG. 12, the fixture is rotatable about the axis of hole 132 to various positions such as the right angles to the position illustrated or at 45 degrees from the position, unless the pivot pin engaging hole 132 is retractable whereupon the fixture of FIG. 12 would also be translatable.

Figure 13:
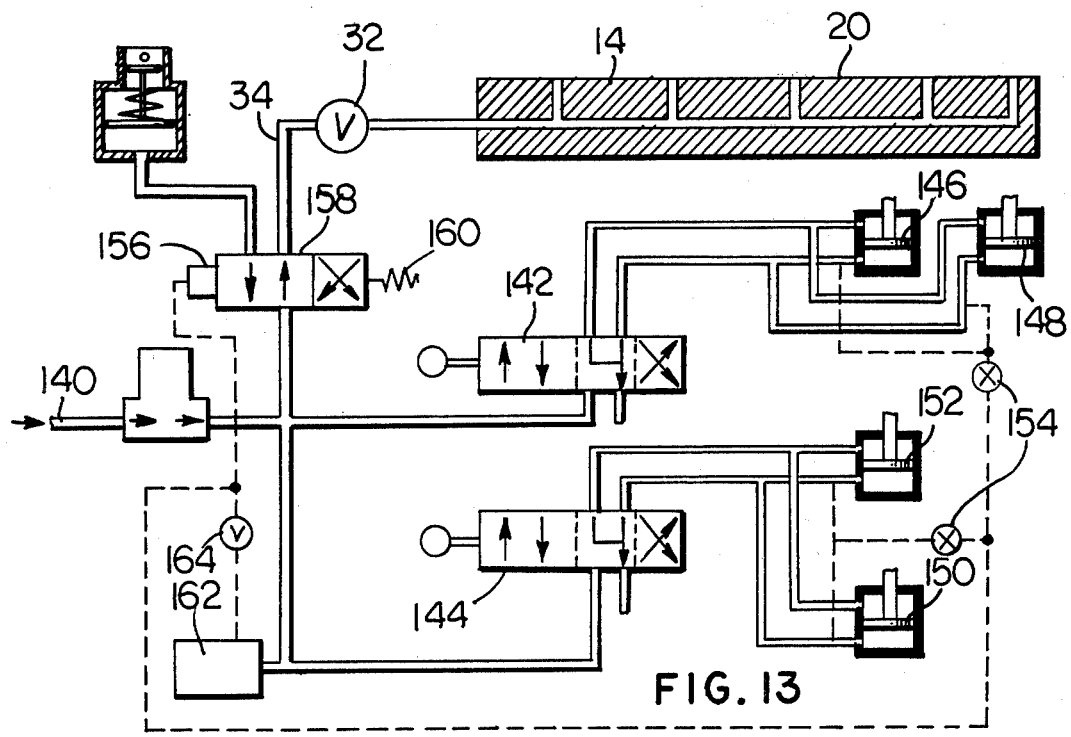
FIG. 13 is a schematic view showing a preferred form for the fluid control circuit according to the present invention.

A simplified showing of the circuit for actuating the locating pins is shown in FIG. 13. In this Figure, a source of pressure 140 is supplied through an air accumulator to the pressure inlets of valves 142 and 144. Each of these valves is a three position valve and operable for reversibly connecting the fluid inlet to one or the other of the service conduits connected thereto while exhausting the other service conduit and also having a position in which both of the service conduits are connected to exhaust.

The valve 142 may have the one service line connected to the upwardly facing sides of a pair of locating pin actuating pistons 146 and 148 with the other service line connected to the underneath sides of the pistons.

Valve 144, similarly, has one service line connected to the upwardly facing sides of pistons 150 and 152 pertaining to locating pins while the other service conduit is connected to the underneath sides of the pistons.

The conduits leading to the underneath sides of the pistons connected through needle valves 154 to a pilot cylinder 156 on a reversing valve 158 having a pressure inlet connected through the valve to the aforementioned conduit 34 representing the pressure supply to the table 14 for floating the fixture 16 thereon.

Valve 158 is normally held in position to supply pressure to conduit 34 by spring 160 but will move into position to exhaust conduit 34 when the pressure in pilot cylinder 156 reaches a predetermined amount. Thus, when the valves 142 and 144 are actuated to drive the locating pins upwardly into locating position, after the pins become seated, the pressure built up on the underneath sides of the pistons will cause valve 158 to shift to interrupt the air supply to the fluid cushion of fixture 16.

Similarly, a valve arrangement at 162 could be actuated in a similar manner via needle valve 164 so that following shifting of valve 158 to interrupt the air cushion, the hydraulic clamping device would be actuated.

The sequence of steps could, of course, be entirely under the control of manual valves, if so desired.

Figure 14:
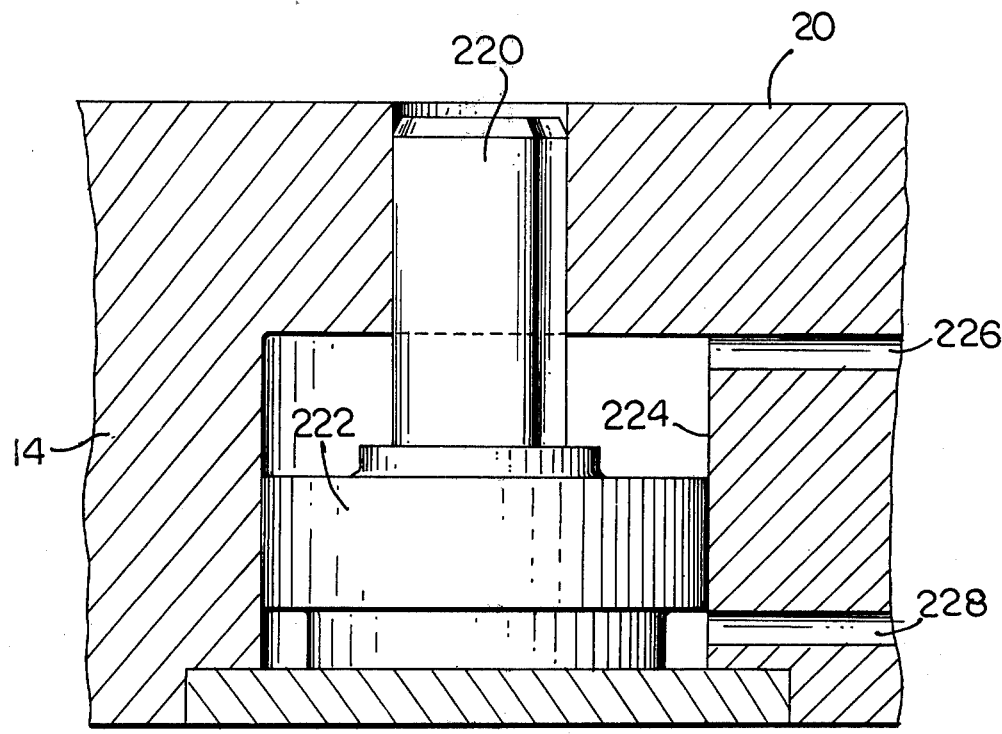
FIG. 14 shows a center pin which is retractable.

FIG. 14 shows how a centering pin 220 could be connected to a piston 222 reciprocable in cylinder 224 in the table 14 with fluid under pressure being supplied to opposite ends of cylinder 224 by passages 226 and 228 in the table. With the FIG. 14 arrangement, the pin 220 can be retracted into the table out of the range of movement of fixture 16, or it can be moved upwardly to engage a centering hole or slot in the fixture.

Figure 15:
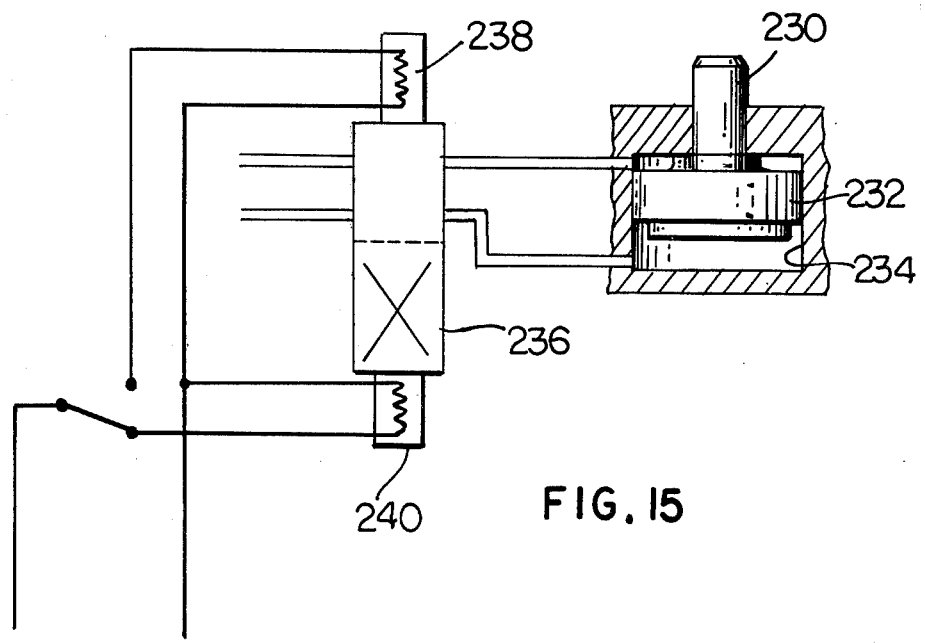
FIG. 15 shows a modification in which a locating pin is provided with a valve providing for selective control of the respective pin.

FIG. 15 shows a locating pin 230 connected to a piston 232 reciprocable in a cylinder 234 in the table; the same as is shown in FIG. 13. The difference in the arrangement of FIG. 15 is the provision of a selector valve 236 actuating solenoids 238 and 240 and providing for selective actuation of locating pin 230 so that it could be used as a centering pin for certain purposes, if so desired.

The present invention is also adapted for use in cases where the table is rotatable. With a fixture mounted on such a rotatable table, the table can be caused to rotate freely for a positioning of the fixture while pin and socket means are provided with the socket means on one end of the table and fixture and the pin means on the frame of the tool for fixing the table and the fixture thereon in predetermined rotated positions.

The construction of many of the lathe-type machine tools is such that the tool holding side head, or the tool holding turret side head, positions the tool in such a way as to bisect the circular table holding the work member. However, in any event, the pin can be located as a part of the machine tool, or independent of the machine tool, in such a way as to be exactly in line with the tool centers as they pass across the table, reaching various portions of the diameter of the table.

In most instances, it would be preferable for the pin, its housing, and the actuating unit, to be located on the bottom portion of the side head turret. The center of the pin would be in exact agreement with the center of the other tools housed in the turret, and consequently bisecting the table, and exactly in line with other tool stations on the machine tool, such as turret head traveling over the work member supported by a carriage, either in the horizontal or vertical environment.

The socket locating holes machined in the outer periphery of the circular bed and/or circular fixture plate resting on the circular table provide for location of the drill or milling cutter to the workpiece in an "X" environment, while a manual or N/C movement of the carriage, housing the drilling or milling cutting tool provides the "Y" environment.

In many cases, circular parts have bolt hole drilling requirements such that the "Y" environment once established will not move until the bolt circle has been completed. Also, in many cases, a keyway or similar surface must be located accurately with respect to the drilled holes on the work member, or with respect to some other important configuration of the work member. The cooperating socket holes perform this locating function quickly, easily and accurately.

The socket locating holes could be machined in the outer periphery of the machine tool circular table in one or more rows, or in other configurations as required. In addition, special socket hole locations for highly special parts might be incorporated in the periphery of circular work member holding fixture plates which are attached to the circular machine tool bed.

The socket locating holes might incorporate a tapered bushing if properly affixed to avoid a safety problem; might be taper machined directly into the bed and strengthened through hardening; or might be straight bore holes so that the cooperating pin, having a slightly tapered front end, might be inserted in a relatively slow manual environment with high reliability.

The pin, itself, located in a housing, held rigidly in place, preferably on the lower portion of the side head turret station so that it can make contact with any and all cooperating holes on the machine tool bed and bisect the table, similar to other cutting tools housed in the turret. The pin itself should be very rigid, an inch or more in diameter, properly supported inside the housing in order to be injected straight forward in the desired line.

The pin should preferably be tapered to match a cooperating tapered locating hole; however, it might, under a number of circumstances, be slightly tapered in the front to provide for the initial locating, and then a straight section of the pin driven into a straight section of the cooperating hole. This arrangement would provide for a somewhat larger contacting surface and would hold the table rigidly, even though the table would be in a free rotating environment on the machine tool, with sufficient force to hold the table rigid to permit the desired milling or drilling to the work member.

The pin could be injected or withdrawn through the use of a screw, cam-level or similar devices; however, it is more preferable that the pin utilize the initial spring locating feature, and the follow-up fluid pressure system outlined previously. In a sophisticated machine tool control environment, this pin might be operated by a machine tool control system in conjunction with a breaking device on the rotating table, and/or provide the signal for beginning the next function, such as the machining operation.

Figure 16:
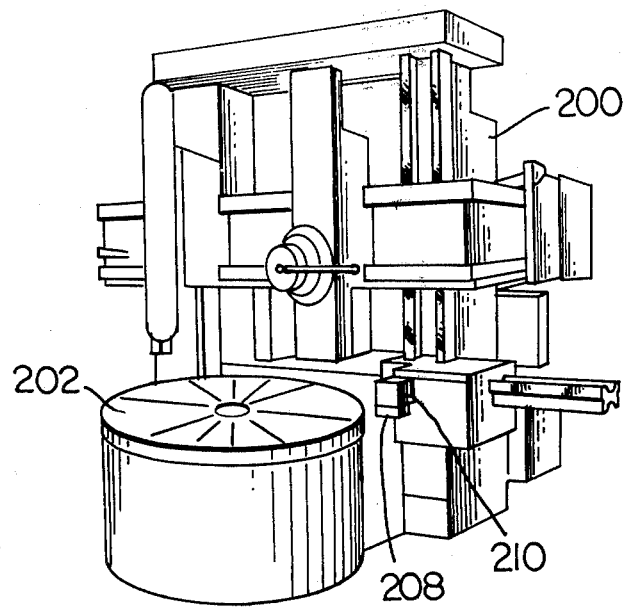
FIG. 16 is a schematic perspective view of a machine tool having a rotary table.
Figure 18:
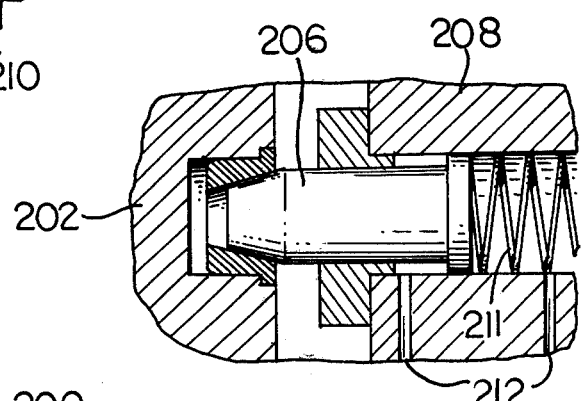
FIG. 18 is a fragmentary view drawn at still further enlarged scale.
Figure 17:
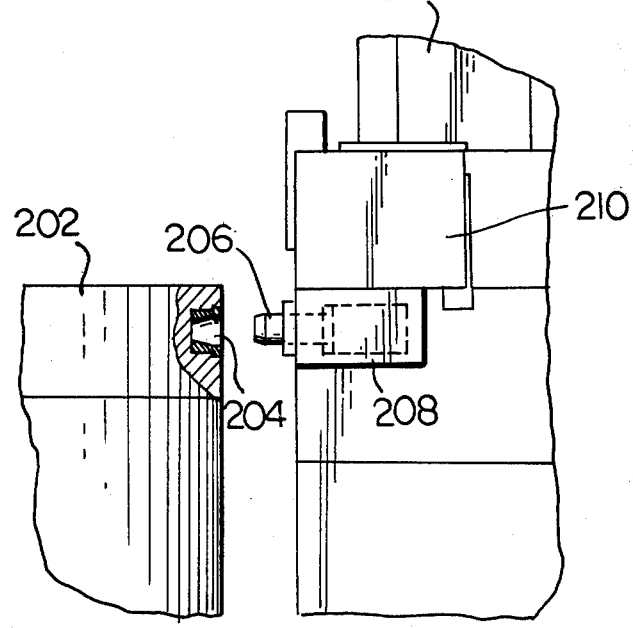
FIG. 17 is a fragmentary view showing a portion of FIG. 16 at enlarged scale.

The arrangement described immediately above is shown FIGS. 16 through 18 wherein 200 is the frame of a machine having a table 202 rotatable therein and adapted for receiving a workpiece supporting fixture according to the present invention.

In the particular modification illustrated, table 202 has socket means 204 therein with pin means 206 carried in a housing 208 secured to one side of side head turret 210. As mentioned, the socket means could be provided in a fixture mounted on the table but now shown in FIGS. 16 and 17.

FIG. 18 shows the construction of pin 206 and the housing 208 therefor, and it will be seen that the pin is biased by a spring 211 toward socket engaging position and may, further, be under the control of, for example, fluid pressure supplied via conduits 212.

As mentioned above, pin means 206 could be under automatic control, if so desired.

Modifications may be made within the scope of the appended claims.

What is claimed is:

1. An apparatus for supporting a work member in a machine tool for the machining thereof comprising:
   a table in a machine tool having an upwardly facing upper surface,
   a fixture having a downwardly facing lower surface resting on the upper surface of the table and adapted for having a work member mounted thereon,
   means for supplying fluid under pressure between said surfaces for floatingly supporting the fixture on the table to permit free movement of the fixture thereon,
   locating means for selectively positively locking said fixture on said table in at least two different predetermined positions against any horizontal movement thereon and for permitting translational movement of the fixture on the table and mechanically confining the movement of said fixture on said table when it is translated from one of said predetermined positions to the other,
   said locating means comprising a pair of spaced apart locating pin means extending from one of said surfaces and at least three openings in the other of said surfaces, said pair of pin means being engageable respectively with a pair of said openings when said fixture is in one of said predetermined positions, one of said pin means being engageable with one of said openings during the movement of said fixture between one of said predetermined positions to the other of said predetermined positions, and said pair of pin means being engageable with a pair of said openings when said fixture is in the other of said positions,
   at least one of said pin means being selectively retractable, and
   clamp means on the table for clamping the fixture thereto.

2. The apparatus of claim 1 wherein:
   said pin means are mounted in said table,
   one of said pin means is tapered and one of said openings comprises a correspondingly tapered socket in said fixture, and
   said locating means includes fluid actuator means in the table connected to said one of said pin means for retracting same into said table thereby permitting controlled movement of said fixture on said table.

3. The apparatus of claim 2 wherein the other of said openings comprises a slot in said fixture adapted to receive the other of said pin means.

4. The apparatus of claim 3 including means for selectively retracting the other of said pin means into said table.

5. The apparatus of claim 1 wherein:
   at least one of said pin means are mounted in said table and are tapered,
   said openings comprise correspondingly tapered sockets in said fixture,
   said locating means include fluid actuator means for selectively retracting said pin means into said table to free the fixture for movement over the table,
   one of said pin means includes a translation pin extending upwardly from said table, and one of said openings is a slot in said fixture lower surface engageable with said translation pin.

6. The apparatus of claim 5 including means for retracting said translation pin into said table.

7. The apparatus of claim 5 in which said fluid actuator means includes a pair of fluid actuators connected respectively to said pin means, said actuators being spring biased upwardly toward socket engaging positions.

8. The apparatus of claim 1 in which said table includes fluid passage means distributed therein and connections leading from said passage means through said table upper surface and distributed thereon.

9. The apparatus of claim 8 in which each connection includes a valve normally closing the respective connection and having an actuator protruding above the upper surface so as to be engageable by said fixture for operating the respective valve.

10. The apparatus of claim 1 wherein said locating means includes a fluid actuator for each said locating pin means, and valve means connected to said actuators for controlling the movement of said locating pin means.

11. The apparatus of claim 10 in which said valve means has a first position in which the actuators withdraw the respective locating pin means into the table, a second position in which the actuators drive the respective pin means into the openings in the fixture positioned above the respective pin means and a third position in which the actuators are exhausted, each actuator including spring means biasing the respective locating pin means toward socket engaging position.

12. The apparatus according to claim 1 includes means rotatably supporting said table in said machine, socket means in the periphery of said table, and pin means on the machine selectively engageable with said socket means in predetermined rotated positions of said table.

13. The apparatus according to claim 1 in which said machine tool includes a frame and means rotatably supporting said table in the frame, outwardly opening socket means on the outwardly facing region of at least one of said table and fixture, and pin means on said frame selectively engageable with said socket means in predetermined indexed positions of said table in said frame.

14. An apparatus for supporting a work member in a machine tool for the machining thereof comprising:
   a table in a machine tool having an upwardly facing upper surface,
   a fixture having a downwardly facing lower surface resting on the upper surface of the table and adapted for having a work member mounted thereon,
   means for supplying fluid under pressure between said surfaces for floatingly supporting the fixture on the table to permit free movement of the fixture thereon,
   said means for supplying fluid including a plurality of fluid outlets distributed over said table surface, connection means for connecting said outlets to a supply of fluid under pressure, and valve means in each outlet for controlling the passage of fluid to said outlets including a valve opening actuator extending above said table surface so as to be engaged and actuated by said fixture as it is moved over said table,
   selectively interengageable locating pin and socket means on said table and fixture to locate said fixture on said table in a predetermined position, and
   clamp means on said table for clamping said fixture thereto.

15. The apparatus of claim 14 wherein said actuator is a spring biased ball selectively opening said outlet when depressed.

16. The apparatus of claim 14 including fluid actuator means for selectively causing said locating pin and socket means to interengage, and means for automatically interrupting the supply of fluid under pressure between said fixture and table when said locating pin and socket means are interengaged.

17. An apparatus for supporting a work member in a machine tool for the machining thereof comprising:
 a table in a machine having an upwardly facing upper surface,
 a fixture having a downwardly facing lower surface resting on the upper surface of the table and adapted for having a work member mounted thereon,
 means for supplying fluid under pressure between said surfaces for floatingly supporting the fixture on the table to permit free movement of the fixture thereon,
 locating means for selectively positively locking said fixture on said table in at least two different and predetermined positions against any horizontal movement thereon and for permitting translational movement of the fixture on the table and for mechanically confining the movement of said fixture on said table when it is moved from one of said predetermined positions to the other,
 said locating means comprising at least three spaced apart locating pin means extending from one of said surfaces and at least two openings in the other of said surfaces, two of said pin means being engageable respectively with a pair of said openings when said fixture is in one of said predetermined positions, one of said pin means being engageable with one of said openings during the movement of said fixture between one of said predetermined positions to the other of said predetermined positions, and two of said pin means being engageable with a pair of said openings when said fixture is in the other of said positions,

18. Apparatus for supporting and locating a work member comprising:
 a table having an upwardly facing upper surface,
 a fixture having a downwardly facing lower surface resting on the upper surface of the table and adapted for having a work member mounted thereon,
 means for supplying fluid under pressure between said surfaces for floatingly supporting the fixture on the table to permit free movement of the fixture thereon,
 locating means for selectively positively locking said fixture on said table in at least two different predetermined positions against any horizontal movement thereon and for permitting translational movement of the fixture on the table and mechanically confining the movement of said fixture on said table when it is translated from one of said predetermined positions to the other,
 said locating means comprising a pair of spaced apart locating pin means extending from one of said surfaces and at least three openings in the other of said surfaces, said pair of pin means being engageable respectively with a pair of said openings when said fixture is in one of said predetermined positions, one of said pin means being engageable with one of said openings during the movement of said fixture between one of said predetermined positions to the other of said predetermined positions, and said pair of pin means being engageable with a pair of said openings when said fixture is in the other of said positions,
 at least one of said pin means being selectively retractable, and
 clamp means on the table for clamping the fixture thereto.

19. The apparatus of claim 18 wherein:
 said pin means are mounted in said table,
 one of said pin means is tapered and one of said openings comprises a correspondingly tapered socket in said fixture, and
 said locating means includes fluid actuator means in the table connected to said one of said pin means for retracting same into said table thereby permitting controlled movement of said fixture on said table.

20. The apparatus of claim 19 wherein the other of said openings comprises a slot in said fixture adapted to receive the other of said pin means.

21. The apparatus of claim 18 wherein:
 at least one of said pin means are mounted in said table and are tapered,
 the openings comprise correspondingly tapered sockets in said fixture,
 said locating means include fluid actuator means for selectively retracting said pin means into said table to free the fixture for movement over the table,
 one of said pin means includes a translation pin extending upwardly from said table, and one of said openings is a slot in said fixture's lower surface engageable with said translation pin.

22. The apparatus of claim 18 in which said table includes fluid passage means distributed therein and connections leading from said passage means through said table upper surface and distributed thereon, each said connection includes a valve normally closing the respective connection and having an actuator protruding above said upper surface so as to be engageable by said fixture for opening the respective valve.

23. The apparatus according to claim 18 which includes means rotatably supporting said table in a machine, socket means in the periphery of said table, and pin means on the machine selectively engageable with said socket means in predetermined rotated positions of said table.

24. The apparatus according to claim 18 including a machine tool having a frame and means rotatably supporting said table in the frame, outwardly opening socket means on the outwardly facing region of at least one of said table and fixture, and pin means on said frame selectively engageable with said socket means in predetermined indexed positions of said table in said frame.

25. Apparatus for supporting a work member comprising:
 a table having an upwardly facing upper surface,
 a fixture having a downwardly facing lower surface resting on the upper surface of the table and adapted for having a work member mounted thereon,
 means for supplying fluid under pressure between said surfaces for floatingly supporting the fixture on the table to permit free movement of the fixture thereon, said means for supplying fluid including a plurality of fluid outlets distributed over said table surface, connection means for connecting said outlets to a supply of fluid under pressure, and valve means in each outlet for controlling the passage of fluid to said outlets including a valve opening actuator extending above said table surface so as to be engaged and actuated by said fixture as it is moved over said table, selectively interengageable locating pin and socket means on said table and fixture to locate said fixture on said table in a predetermined position, and clamped means on said table for clamping said fixture thereto.

26. Apparatus for supporting and locating a work member comprising:

a table having an upwardly facing surface, a fixture having a downwardly facing lower surface resting on the upper surface of the table and adapted for having a work member mounted thereon, means for supplying fluid under pressure between said surfaces for floatingly supporting the fixture on the table to permit free movement of the fixture thereon, locating means for selectively positively locking said fixture on said table in at least two different and predetermined positions against any horizontal movement thereon and for permitting translational movement of the fixture on the table and for mechanically confining the movement of said fixture on said table when it is moved from one of said predetermined positions to the other, said locating means comprising at least three spaced apart locating pin means extending from one of said surfaces and at least two openings in the other of said surfaces, two of said pin means being engageable respectively with a pair of said openings when said fixture is in one of said predetermined positions, one of said pin means being engageable with one of said openings during the movement of said fixture between one of said openings during the movement of said fixture between one of said predetermined positions to the other of said predetermined positions, and two of said pin means being engageable with a pair of said openings when said fixture is in the other of said positions, at least one of said pins being selectively retractable, and clamp means on the table for clamping the fixture thereto.

* * * * *